May 13, 1941. R. J. WOODS 2,242,198
NACELLE CONSTRUCTION
Filed July 7, 1938 5 Sheets-Sheet 5
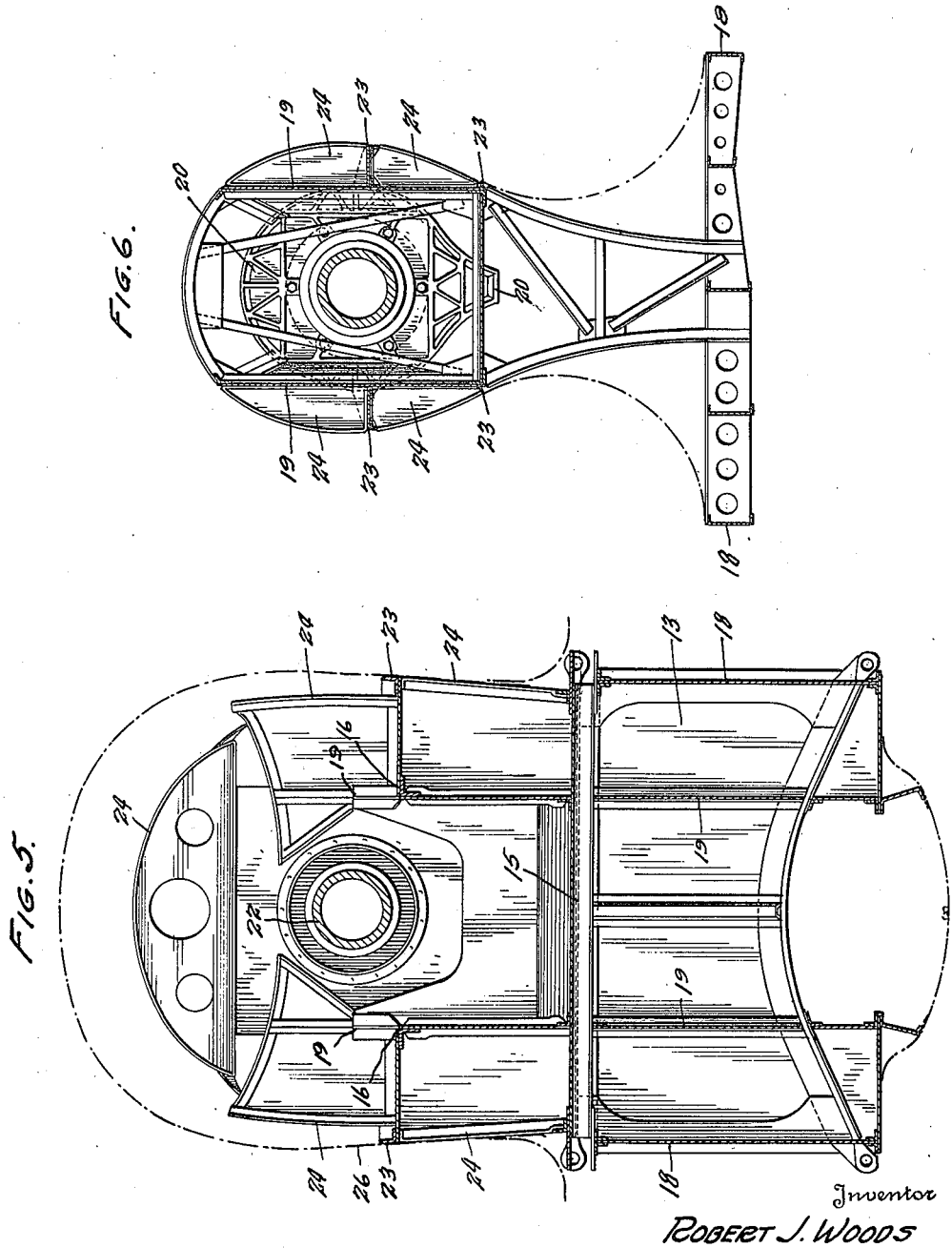
Inventor
ROBERT J. WOODS
By Semmes Keegin & Semmes
Attorneys Patented May 13, 1941

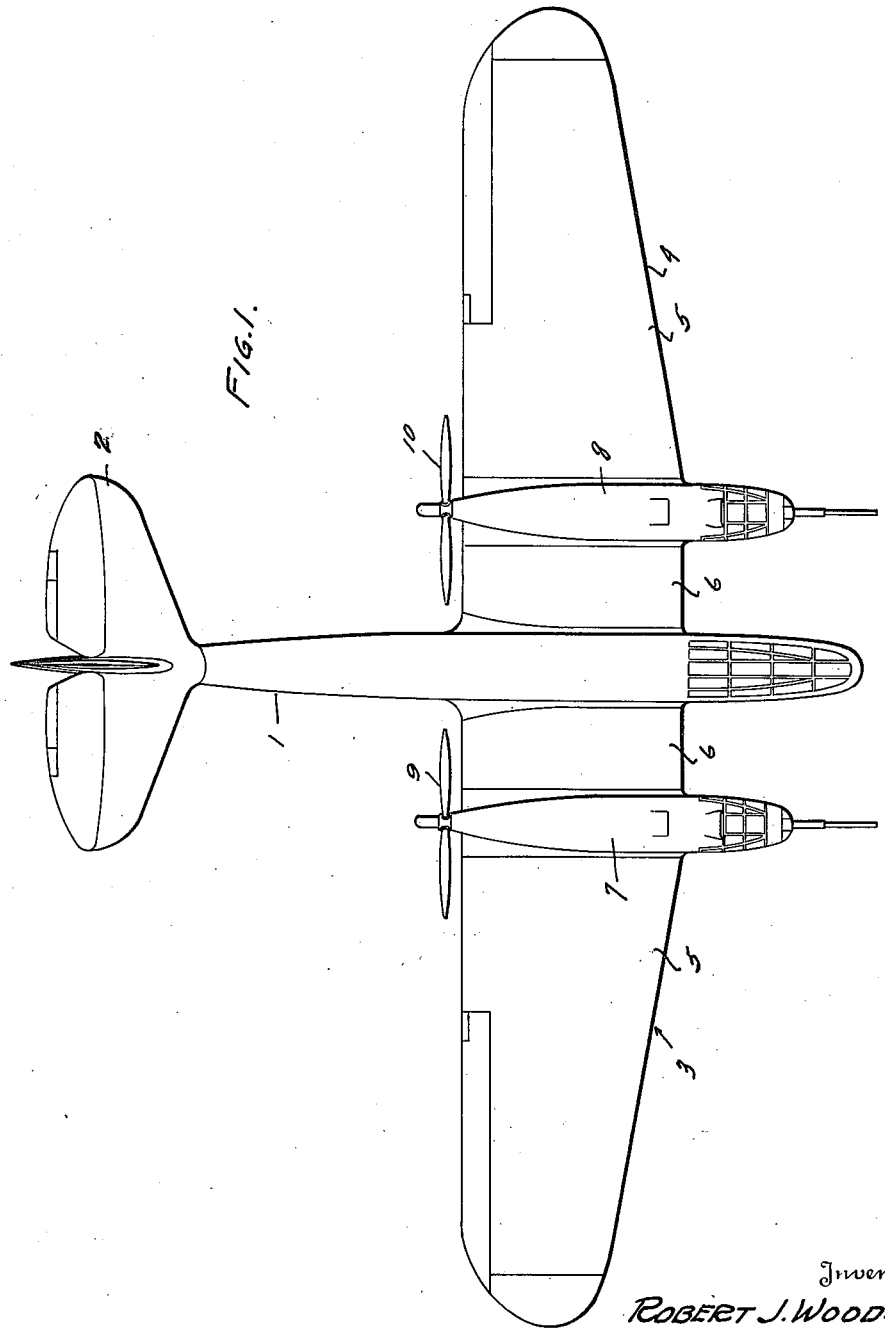

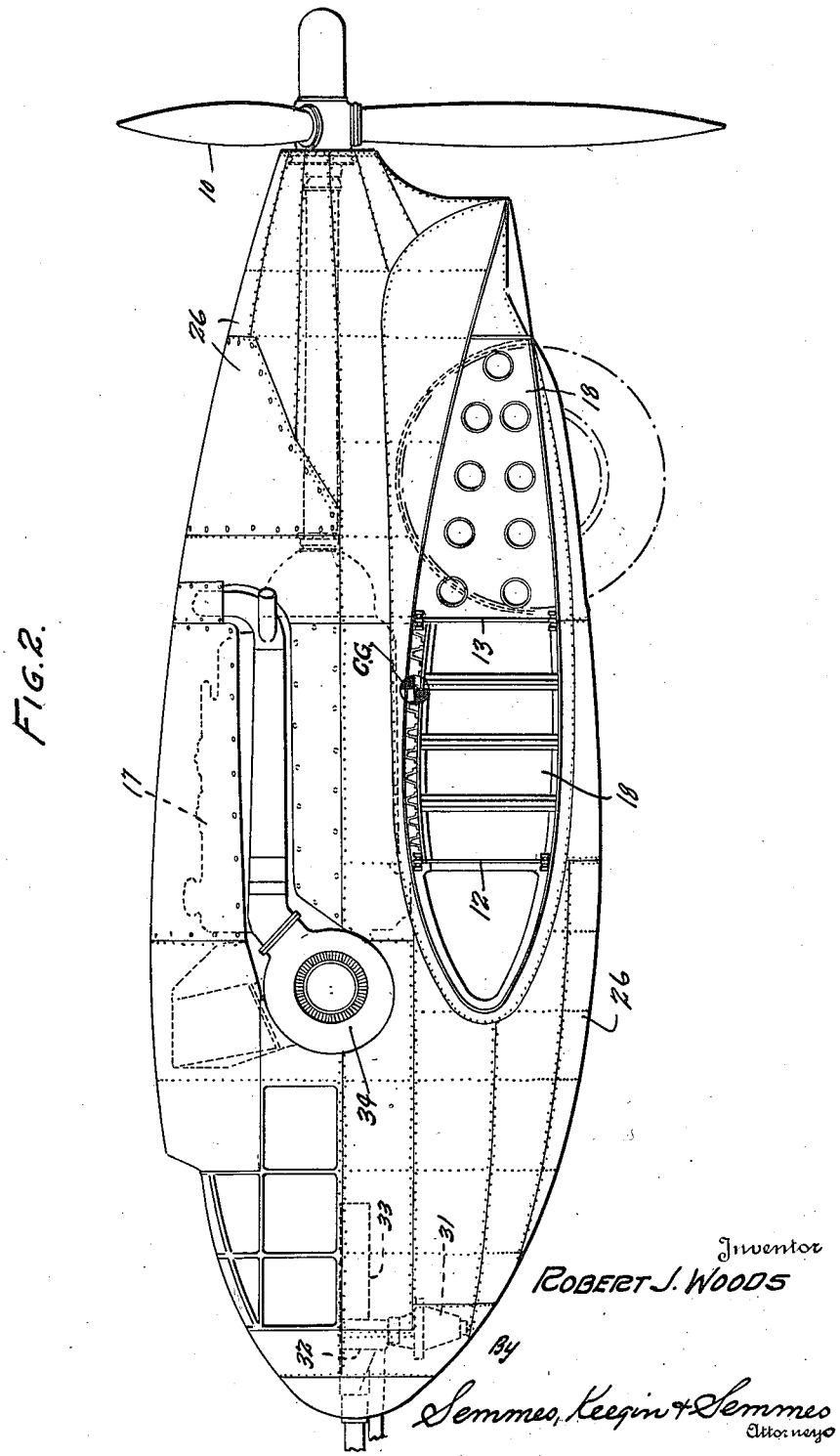

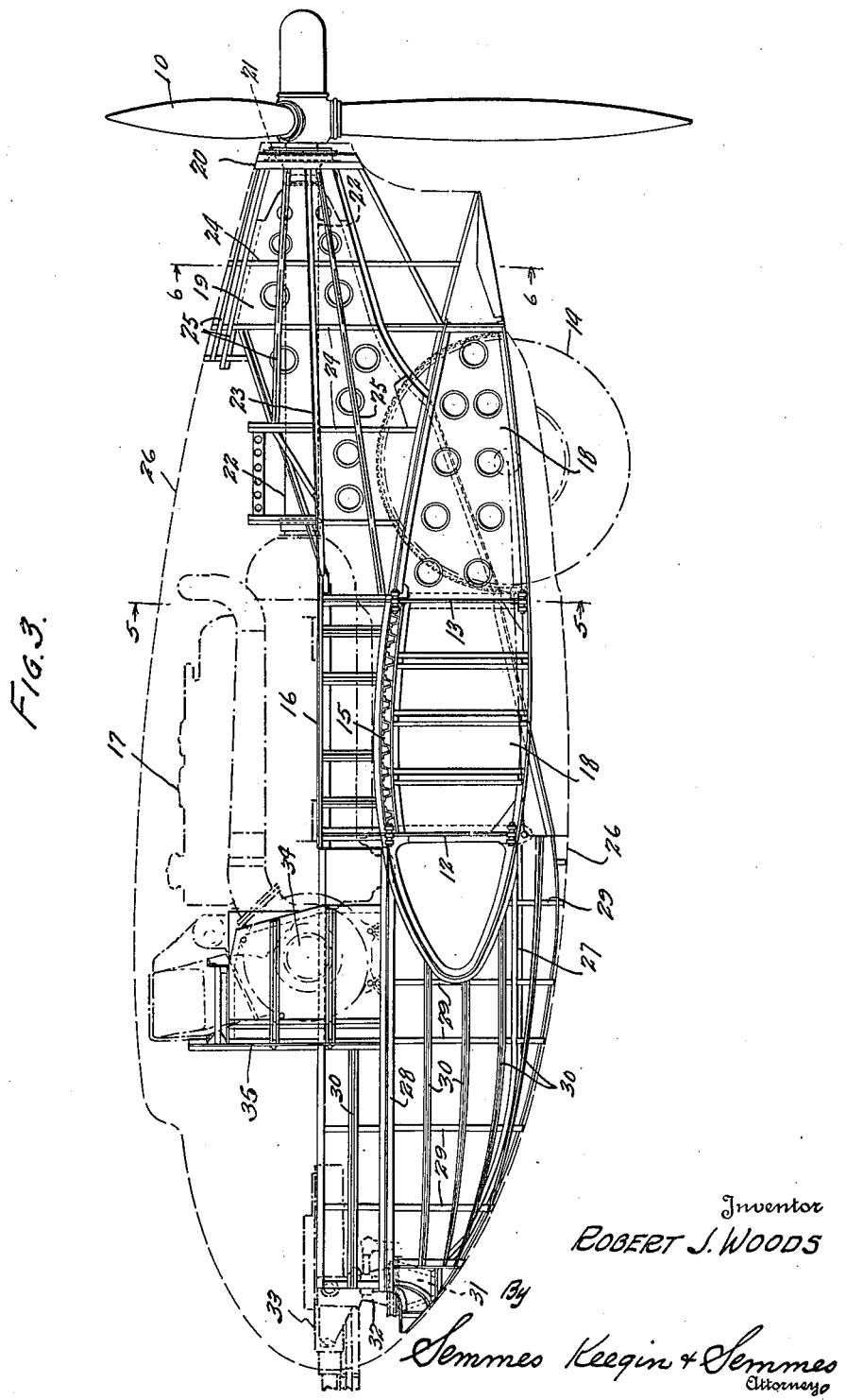

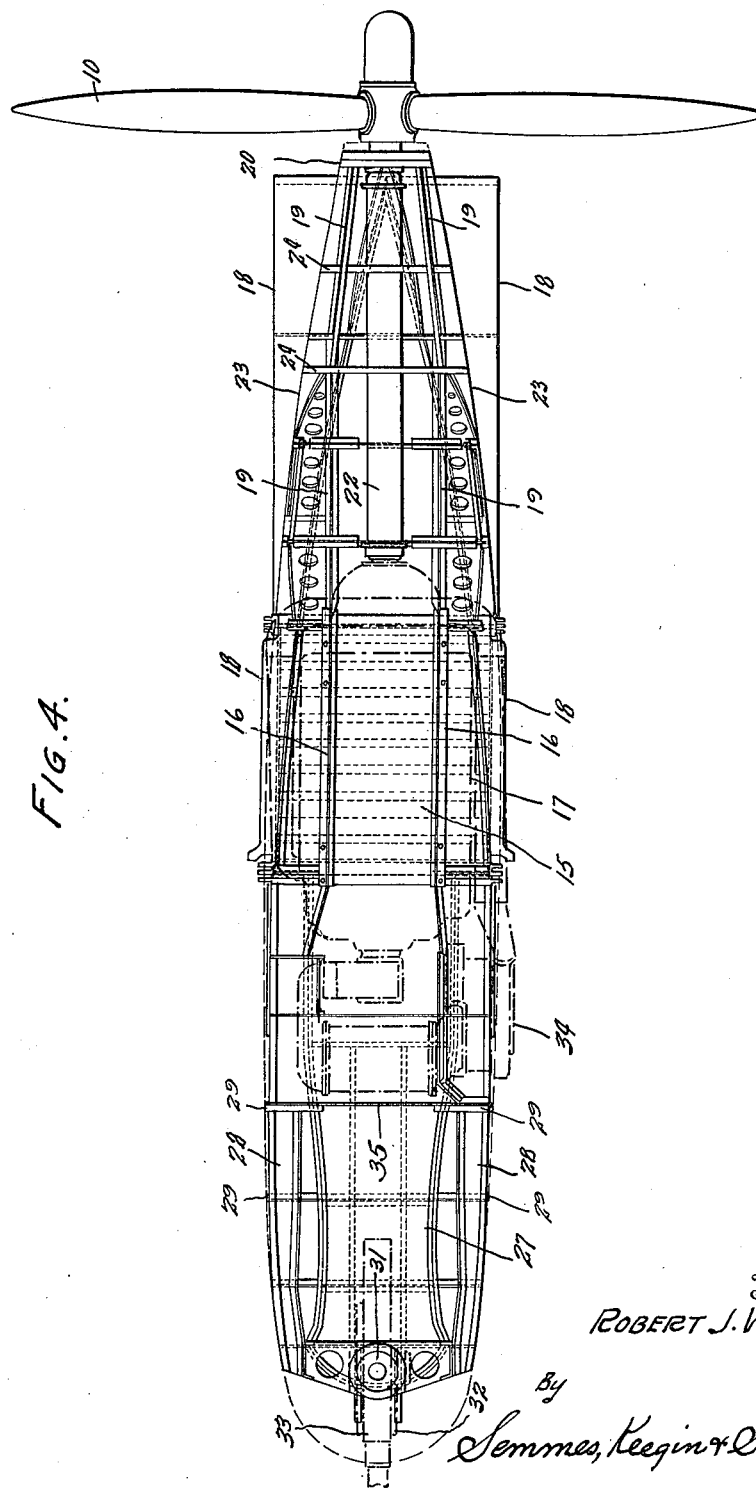

2,242,198

UNITED STATES PATENT OFFICE 2,242,198

NACELLE CONSTRUCTION

Robert J. Woods, Grand Island, N. Y., assignor to Bell Aircraft Corporation, Buffalo, N. Y., a corporation of New York Application July 7, 1938, Serial No. 217,988

7 Claims. (Cl. 89—37.5)

This invention relates to the nacelle construction of outboard powered aircraft, and more particularly to a nacelle of the pusher type which is constructed so as to provide an engine mount located over the center of gravity of the ship, a support for an extension shaft of a pusher type propeller, and a useful load space forward of the engine mount.

In conventional wing motor nacelles of the pusher type, the engine is mounted in the after part of the nacelle. This arrangement severely limits the load space and the degree of streamlining that can be accomplished in the aft section of the nacelle and necessitates an increase in weight of the nacelle structure. Moreover, this location of the mass aft of the center of gravity tends to make the ship excessively tail heavy which constitutes a serious problem of design, stability and maneuverability.

These difficulties are overcome in this invention by employing an extension propeller shaft, the use of which allows the engine to be mounted over the center of gravity of the airplane, thereby allowing a useful load space to be provided aft, as well as forward of the engine mount, provides for optimum streamlining, and also improves the balance, stability and maneuverability of the ship.

However, in positioning the engine at the center of gravity, problems in nacelle structure arise, especially in regard to supporting the relatively long propeller shaft with the weight of the propeller overhung on the rear end in such a manner as to prevent lash of the shaft with its consequent vibration and danger of damage to the shaft or to the nacelle structure.

One of the objects of my invention is to satisfactorily overcome these problems in nacelle structure.

Another object of my invention is to provide a motor wing nacelle of a pusher type for outboard powered aircraft which is so constructed that the engine may be mounted substantially at the center of gravity of the airplane by employing an extension propeller shaft.

Still another object of my invention is to provide a monocoque structure for the wing motor nacelles of outboard powered aircraft which is so constructed that a rigid support for an extension shaft of a pusher type propeller is supplied.

Still another object of my invention is to provide a monocoque structure for wing motor nacelles of outboard powered aircraft which is so constructed that a useful load space is provided forward and aft of the engine.

A further object of my invention is to provide a structure whereby a gun may be mounted in the useful load space forward of the engine in such a manner that the recoil of the gun may be absorbed by the inertia of the mass of the engine.

With these and other objects in view, my invention embraces the idea of providing a wing motor nacelle for outboard powered aircraft which employs a minimum of internal structure and a metallic skin or covering rigidly attached thereto to form a monocoque construction for carrying engines and useful load which will not add to the equivalent flat plate area or parasite drag of the airplane.

The nacelle is so designed that the two main beams, by which it is attached to the main airfoil of the airplane, are located approximately in the axis which forms the center of gravity of the airplane. The engine which forms the largest component mass carried in the nacelle is placed directly over these two main beams. Structure may then be built both forward and aft of these main beams; forward to provide a useful load space and aft to provide a rigid journal for the free end of an extension propeller shaft from the engine and optimum streamlining. The forward structure may provide a swivel mount for a large caliber gun so interconnected with the engine mount that the inert mass of the engine may be utilized to absorb the heavy recoil of the gun. A suitable firewall may be provided between the forward useful load space and the engine to protect personnel inhabiting the useful load space during flight.

In the drawings:

Figure 1 is a top plan view of an airplane which is provided with a plurality of the engine wing nacelles which form the basis of this invention.

Figure 2 is a side elevational view of the motor wing nacelle.

Figure 3 is a view similar to that shown in Figure 2 with the outer skin of the nacelle removed.

Figure 4 is a top plan view of the nacelle shown in Figure 3 with the outer skin removed.

Figure 5 is a vertical cross-sectional view taken along line 5—5 of Figure 3 looking in the direction of the arrows.

Figure 6 is a vertical cross-sectional view taken along line 6—6 of Figure 3 looking in the direction of the arrows.

As best shown in Figure 1, the airplane consists of a fuselage 1, an empennage 2, and airfoils 3 and 4, each of which is composed of an outer panel 5 and an inner panel 6. Mounted between the outer panel 5 and the inner panel 6 of the airfoils 3 and 4 are engine nacelles 7 and 8 which are provided with propellers of the pusher type 9 and 10, respectively.

These nacelles of the pusher type may also be situated entirely within the contour of the airfoils and, although two are shown in the drawings, it is to be understood that any number may be used. These nacelles are similar in design and their construction forms the basis of this invention.

As best shown in Figure 3, the structure of the nacelle 7 consists of a front beam 12 and a rear beam 13 which are fastened to the main beams of outer panel 5 and the inner panel 6. These beams are of sheet web construction with machined flanges. The front beam 12 is designed to carry struts which support the landing wheel 14 and the rear beam 13 is designed to carry one end of the mechanism for retracting and bracing the wheel 14. This landing gear is not disclosed in the drawings.

The nacelle construction also consists of a wing structural carry-through 15 and an engine mount 16 which is positioned above the beams 12 and 13. This engine mount 16 is located substantially at the center of gravity and is designed to provide a bed for the engine 17.

Mounted on either side of the nacelle 7 are a pair of wing ribs 18 which are attached to the front and rear beams 12 and 13. These wing ribs 18 are constructed so as to provide a well for the landing gear 14 when it is in retracted position, and are adapted to complete the airfoil 3.

The rear part of the nacelle structure consists of a pair of longitudinal beams 19 which are built into the engine mount 16 and the wing ribs 18 and extend aft to an aluminum alloy frame 20 which supports a bearing 21 in which is journalled the after end of the propeller shaft 22. The frame 20 is further supported by formers 23 which are also secured to the engine mount 16.

Lateral bulkheads 24 and longitudinal stringers 25 which are of light construction and located at suitable intervals support the outer skin 26 and complete a rigid monocoque structure.

The front of the nacelle 7 consists of a beam 27 which forms the floor and two main longerons 28 which are carried by the front beam 12. Frames 29 and stringers 30 which are similar in construction to the stringers 25 are also provided and are located at suitable intervals. This forwardly extending structure terminates in a cone bearing 31 in which may swivel a gun mount 32 upon which may be mounted a gun of heavy caliber, such as indicated at 33. A supercharger 34 for the engine may be mounted on the longerons 28. In order to complete the monocoque structure, as best shown in Figure 2, sheet material is riveted to this assembly. A firewall 35 is provided between the forward useful load space and the engine 17 and supercharger 34.

From the above description it is believed apparent that a monocoque structure for a motor wing nacelle of the pusher type has been provided which permits the engine to be placed at a most advantageous location near the center of gravity and also provides a suitably rigid support for the extension shaft for the propeller. Moreover, by utilizing this construction, a useful load space is provided in the front of the nacelle in which a gun may be operated in a position which is not only free from propeller blasts but which is under the observation of the pilot and other personnel of the main fuselage at all times, and which furnishes the largest possible angle of fire in the most suitable direction that can be obtained from a wing nacelle. Moreover, by providing a design in which the gun mount and engine mount are rigidly connected, the large recoil loads occurring when the gun fires are absorbed by the mass of the engine which is the only component mass great enough for this purpose without including excess weight in the airplane structure.

Not only is it advantageous to mount a gun in the forward part of the nacelle, but such a forwardly located useful load space is desirable where the weight to be carried is large, where the space is to be used for purposes of observation, or when it is desired to load or unload the useful space without stopping the propellers and without being in the propeller's slip stream. Moreover, with this arrangement it is possible to unload while in flight. Such an arrangement also provides for optimum streamlining aft of the engine and a suitable space for carrying certain essential equipment in the rear section of the nacelle.

As previously mentioned, the centralization of the principal weight of the installed equipment, such as the engine and supercharger, near the center of the mass of the airplane results in an improved balance condition and a decrease in the polar moment of inertia of the airplane, thereby improving the stability and maneuverability.

From the above description it is believed obvious that the nacelle structure which has been described provides an adequate supporting structure for a novel and desirable arrangement with a maximum economy of weight. While for purposes of illustration I have shown one means by which a rigid support can be provided for the engine, supercharger, gun mount and propeller shaft, it is obvious that numerous changes can be made in this construction without departing from the spirit of the invention. I, therefore, wish it to be understood that I desire this invention only to be liimted by the prior art and the scope of the appended claims.

I claim:

1. A wing nacelle of monocoque design for an outboard powered airplane provided with a main airfoil, said nacelle having useful enclosed spaces forward and aft of the power unit; comprising a pair of lateral beams mounted on opposite sides of the pitch axis of the airplane and attached to the main beam of the said airfoil, a pair of longitudinal beams attached to and extending rearwardly from the said lateral beams, a frame supported by the extremities of the longitudinal beams, stringers supported by the said frame, a bearing mounted in the frame, a power unit mounted on the longitudinal beams at a position above the point of intersection of the pitch and roll axes of the airplane, and a propeller shaft extending rearwardly from the power unit, said shaft being supported by the bearing.

2. A motor wing nacelle of monocoque design for an outboard powered airplane of the pusher type provided with a main airfoil, said nacelle having usable enclosed spaces forward and aft of the power unit; comprising a pair of beams positioned on opposite sides of the pitch axis of the airplane and parallel thereto and attached to the main beam of the airfoil, a plurality of longitudinal beams attached to and extending rearwardly from the lateral beams to support the portion of the skin of the monocoque structure enclosing the rearward usable space, a bearing supported by the extremities of the said rearwardly extending longitudinal beams, a plurality of longitudinal beams attached to and extending forwardly from the lateral beams to support the portion of the skin of the monocoque structure enclosing the forward usable space, a cone structure supported by the extremities of said forwardly extending beams, a power unit mounted on the rearwardly extending beams at a position above the point of intersection of the pitch and roll axes of the airplane, and a propeller shaft connected to the power unit and supported by the said bearing.

3. A motor wing nacelle of monocoque design for an outboard powered airplane of the pusher type provided with a main airfoil, said nacelle having usable enclosed spaces forward and aft of the power unit; comprising a pair of lateral beams positioned on opposite sides of the pitch axis of the airplane and parallel thereto and attached to the main beam of the airfoil, a pair of longitudinal beams attached to and extending rearwardly from the lateral beams, a bearing supported by the extremities of the said rearwardly extending longitudinal beams, three longitudinal beams attached to and extending forwardly from the lateral beams, a cone structure supported by the extremities of said three forwardly extending beams, a power unit mounted on the rearwardly extending beams at a position above the point of intersection of the pitch and roll axes of the airplane, and a propeller shaft connected to the power unit and supported by the said bearing.

4. A motor wing nacelle of monocoque design for an outboard powered airplane of the pusher type provided with a main airfoil, said nacelle having usable enclosed spaces forward and aft of the power unit; comprising a pair of lateral beams positioned on either side of the pitch axis of the airplane and parallel thereto, and attached to the main beam of the airfoil, a pair of longitudinal beams attached to and extending rearwardly from the lateral beams to support the portion of the skin of the monocoque structure which encloses the rearward usable space, a bearing supported by the extremities of the said rearwardly extending longitudinal beams, three longitudinal beams attached to and extending forwardly from the lateral beams, a cone structure supported by the extremities of the said three forwardly extending beams, a power unit mounted on the rearwardly extending beams at a position above the point of intersection of the pitch and roll axes of the airplane, a propeller shaft connected to the power unit and supported by the said bearing, and a gun swivel mounted on the said cone.

5. A motor wing nacelle of monocoque design for an outboard powered airplane of the pusher type provided with a main airfoil, said nacelle having usable enclosed spaces forward and aft of the power unit; comprising a pair of lateral beams provided on either side of the pitch axis of the airplane and parallel thereto, and attached to the main beam of the airfoil, a pair of longitudinal beams attached to and extending rearwardly from the lateral beams, a bearing supported by the extremities of the said rearwardly extending longitudinal beams, three longitudinal beams attached to and extending forwardly from the lateral beams, one of said forwardly extending beams forming the floor of the enclosed space forward of the power unit, a cone structure supported by the extremities of said three forwardly extending beams, a power unit mounted on the rearwardly extending beams at a position above the point of intersection of the pitch and roll axes of the airplane, a propeller shaft connected to the power unit and supported by said bearing, and a plurality of stringers and vertical frames to give additional support to the skin of the said monocoque structure, the extremities of at least one pair of said stringers connecting the cone and laterally extending beams.

6. A motor wing nacelle of monocoque design for an outboard powered airplane of the pusher type provided with a main airfoil, said nacelle having usable enclosed spaces forward and aft of the power unit; comprising a pair of lateral beams positioned on opposite sides of the pitch axis of the airplane and parallel thereto, and attached to the main beam of the airfoil, a pair of longitudinal beams mounted on both of the lateral beams and extending rearwardly, a bearing supported by the extremities of said longitudinal beams, three longitudinal beams attached to the lateral beam which is forward of the pitch axis of the airplane, said longitudinal beams extending forward from the lateral beams, a cone structure supported by the extremities of the three forwardly extending beams, a power unit mounted on the rearwardly extending beams and supported by the lateral beams at a position above the point of intersection of the pitch and roll axes of the airplane, a propeller shaft connected to the power unit and supported by the said bearing, and a plurality of stringers and vertical frames to give additional support to the skin of said monocoque structure.

7. A wing nacelle of monocoque design for an outboard powered airplane of the pusher type provided with a main airfoil, said wing nacelle having enclosed spaces forward and aft of the power unit; comprising a pair of lateral beams mounted on opposite sides of the pitch axis of the airplane and attached to the main beam of the said airfoil, a plurality of longitudinal beams attached to and extending rearwardly from the lateral beams, a plurality of longitudinal beams attached to and extending forwardly from the lateral beams to support the portion of the skin of the monocoque structure enclosing the forward usable space, a cone structure supported by the extremities of the said forwardly extending beams, a power unit mounted on the rearwardly extending beams at a position above the point of intersection of the pitch and roll axis of the airplane, and an extension propeller shaft connected to the said power unit.

ROBERT J. WOODS.